US011119290B2

(12) United States Patent
Gaskin et al.

(10) Patent No.: US 11,119,290 B2
(45) Date of Patent: Sep. 14, 2021

(54) ALIGNMENT DEVICE AND TRANSMITTER/RECEIVER SYSTEM WITH TWO ANGULAR DEGREES OF FREEDOM

(71) Applicant: Servomex Group Limited, Crowborough (GB)

(72) Inventors: Ian C. Gaskin, Royal Tunbridge Wells (GB); James D. Hobby, Crowborough (GB); Richard P. Kovacich, Crowborough (GB); Martin Lopez, Rotherfield (GB); Graham R. Terry, Crowborough (GB)

(73) Assignee: SERVOMEX GROUP LIMITED

( * ) Notice: Subject to any disclaimer, the term of this patent is extended or adjusted under 35 U.S.C. 154(b) by 632 days.

(21) Appl. No.: 14/811,937

(22) Filed: Jul. 29, 2015

(65) Prior Publication Data
US 2016/0041359 A1    Feb. 11, 2016

(30) Foreign Application Priority Data

Aug. 8, 2014    (GB) ..................... 1414081

(51) Int. Cl.
*G01N 21/49*    (2006.01)
*G02B 7/00*    (2021.01)
(Continued)

(52) U.S. Cl.
CPC ............ *G02B 7/003* (2013.01); *G01B 11/272* (2013.01); *G01J 3/0202* (2013.01); *G01J 3/0289* (2013.01);
(Continued)

(58) Field of Classification Search
CPC ...... G01B 11/272; G01N 21/39; G02B 7/003; G02B 7/004; G02B 27/0006; G01J 3/0202; G01J 3/0289; G01J 3/42
(Continued)

(56) References Cited

U.S. PATENT DOCUMENTS

| 3,262,360 A | 7/1966 | Gruner et al. ................. 359/818 |
| 3,433,569 A | 3/1969 | Francis .......................... 356/514 |

(Continued)

FOREIGN PATENT DOCUMENTS

| CN | 103868599 A | 6/2014 |
| DE | 26 43 780 A1 | 3/1978 |

(Continued)

OTHER PUBLICATIONS

Combined Search Report and Examination Report Under Sections 17 and 18(3) dated Sep. 30, 2014 for GB Application No. GB141408.1; 5 pages.

(Continued)

*Primary Examiner* — Georgia Y Epps
*Assistant Examiner* — Kevin Wyatt
(74) *Attorney, Agent, or Firm* — Daly, Crowley, Mofford & Durkee, LLP

(57) ABSTRACT

An alignment device having two angular degrees of freedom is provided. The alignment device is adjustable such that it is suitable for aligning a first apparatus with respect to a second apparatus. The first apparatus may emit one or more of electromagnetic waves, acoustic waves and matter towards the second apparatus and for detection by the second apparatus. The first and second apparatuses may be disposed in a harsh environment such as is found in the vicinity of an industrial process stack. In some embodiments the first apparatus is a laser, preferably a tunable diode laser, and the second apparatus is a receiver incorporating a detector. In these embodiments the apparatuses may be used to perform laser absorption spectroscopy on a process gas flowing through an industrial process stack.

38 Claims, 7 Drawing Sheets

(51) Int. Cl.
*G01J 3/02* (2006.01)
*G01J 3/42* (2006.01)
*G01B 11/27* (2006.01)
*G01N 21/39* (2006.01)
*G02B 27/00* (2006.01)
*G02B 27/62* (2006.01)
*G02B 7/02* (2021.01)

(52) U.S. Cl.
CPC ............... *G01J 3/42* (2013.01); *G01N 21/39* (2013.01); *G02B 7/004* (2013.01); *G02B 27/0006* (2013.01); *G02B 27/62* (2013.01); *G01N 2201/068* (2013.01); *G01N 2201/06113* (2013.01); *G02B 7/023* (2013.01)

(58) Field of Classification Search
USPC .................................................. 250/573, 537
See application file for complete search history.

(56) References Cited

U.S. PATENT DOCUMENTS

| | | | | |
|---|---|---|---|---|
| 4,254,972 | A * | 3/1981 | Wiedenbeck | F16L 27/023 285/121.4 |
| 4,365,335 | A * | 12/1982 | Lamboo | H01S 3/041 372/107 |
| 4,655,548 | A | 4/1987 | Jue | 350/245 |
| 4,739,647 | A * | 4/1988 | Monticelli, Jr. | F03G 7/04 73/200 |
| 4,787,750 | A | 11/1988 | Nelson et al. | 356/437 |
| 5,077,905 | A * | 1/1992 | Murray, Jr. | G01B 11/272 33/412 |
| 5,827,620 | A * | 10/1998 | Kendall | H01M 8/0215 429/441 |
| 6,773,170 | B1 | 8/2004 | Georgiev et al. | |
| 7,229,593 | B1 * | 6/2007 | Ho | G01N 13/00 422/50 |
| 2003/0053048 | A1 | 3/2003 | Bennett et al. | 356/301 |
| 2004/0027562 | A1 * | 2/2004 | Otsuka | B23K 26/043 356/154 |
| 2005/0069237 | A1 * | 3/2005 | Mickelson | F16C 23/084 384/492 |
| 2006/0176486 | A1 * | 8/2006 | Ho | F23N 5/082 356/436 |
| 2008/0180819 | A1 | 7/2008 | Wang | 359/822 |
| 2010/0079737 | A1 * | 4/2010 | Bischoff | G02B 7/025 355/67 |
| 2011/0222959 | A1 * | 9/2011 | Beutler | F16C 11/0671 403/122 |
| 2013/0194688 | A1 * | 8/2013 | Zhu | G02B 7/004 359/894 |
| 2016/0018618 | A1 * | 1/2016 | Marr | B32B 37/18 248/276.1 |

FOREIGN PATENT DOCUMENTS

| | | |
|---|---|---|
| EP | 0047049 | 3/1982 |
| EP | 1 189 091 A2 | 3/2002 |
| EP | 2 530 452 | 12/2012 |
| GB | 2 005 862 A | 4/1979 |
| JP | 2007212378 | 8/2007 |

OTHER PUBLICATIONS

Partial European Search Report dated Dec. 9, 2015 corresponding to European Application No. 15179852.7; 9 Pages.

Response to Partial European Search Report dated Dec. 9, 2015 corresponding to European Application No. 15179852.7; Response Filed on Feb. 19, 2016; 1 Page.

Extended European Search Report dated Mar. 14, 2016 corresponding to European Application No. 15179852.7; 17 Pages.

Response (with Amended Claims) to Extended European Search Report dated Mar. 14, 2016 corresponding to European Application No. 15179852.7; Response filed on Jul. 22, 2016; 18 Pages.

Response (with Amended Specification and Claims) to British Examination Report dated Sep. 30, 2014 corresponding to British Application No. 1414081.8; Response Filed on Jul. 22, 2016; 25 Pages.

British Examination Report dated Sep. 7, 2016 corresponding to British Application No. 1414081.8; 2 Pages.

Response (with Amended Specification) to British Examination Report dated Sep. 7, 2016 corresponding to British Application No. 1414081.8; Response Filed on Oct. 5, 2016; 5 Pages.

European Examination Report dated Nov. 8, 2018 for European Application No. 15179852.7; 6 Pages.

Chinese First Office Action (with English Translation) dated Dec. 19, 2018 for Chinese Application No. 201510487608.6; 19 Pages.

Response to European Examination Report dated Nov. 8, 2018 for European Application No. 15179852.7; Response filed May 3, 2019; 25 Pages.

Chinese Second Office Action (with English Translation) dated Sep. 5, 2019 for Chinese Application No. 201510487608.6; 14 Pages.

* cited by examiner

PRIOR ART

PRIOR ART

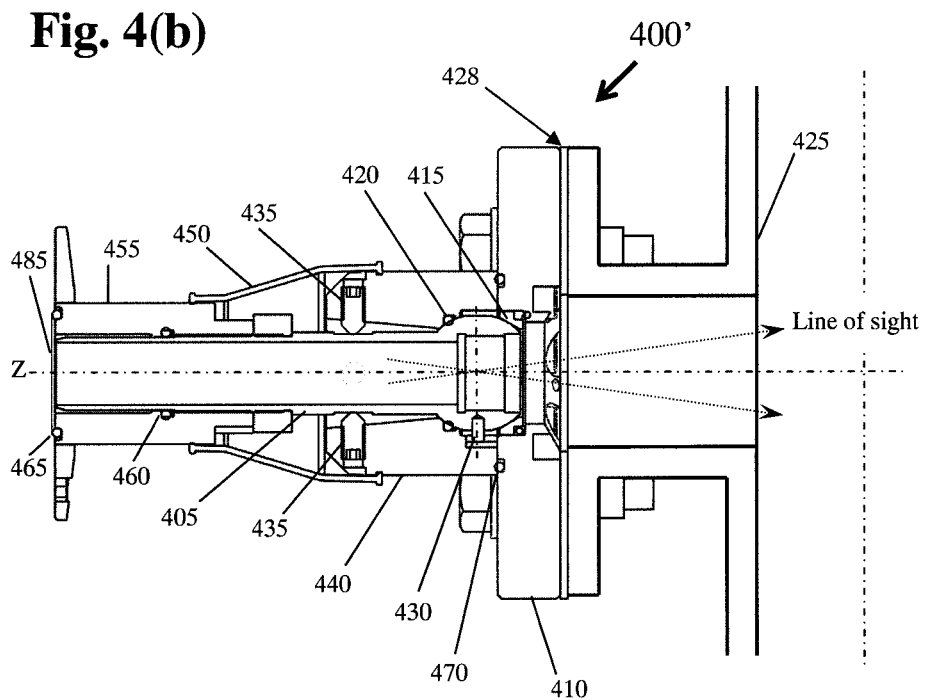

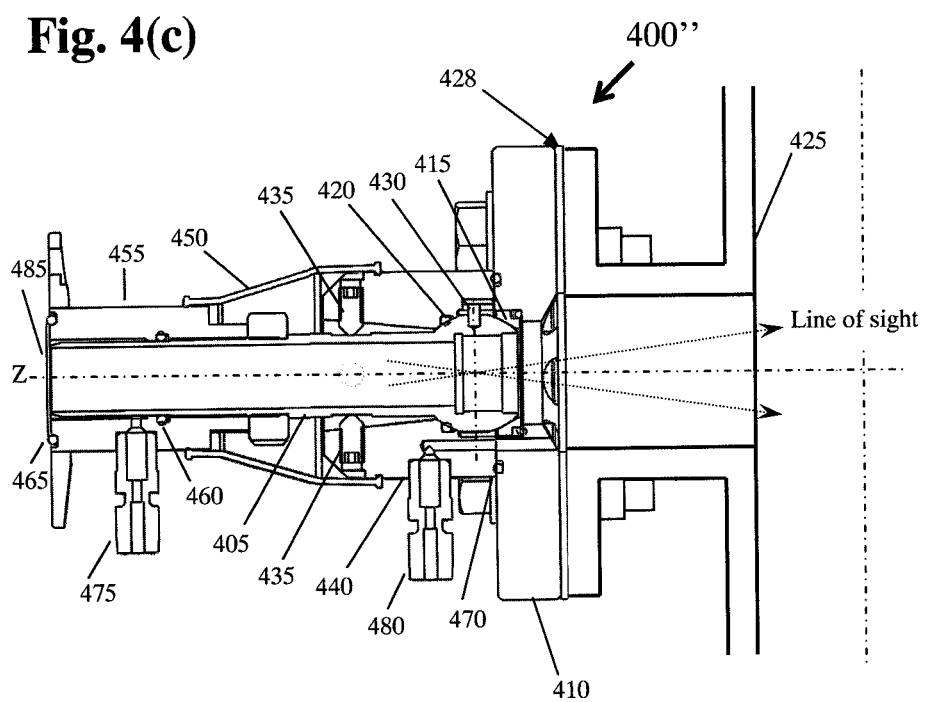

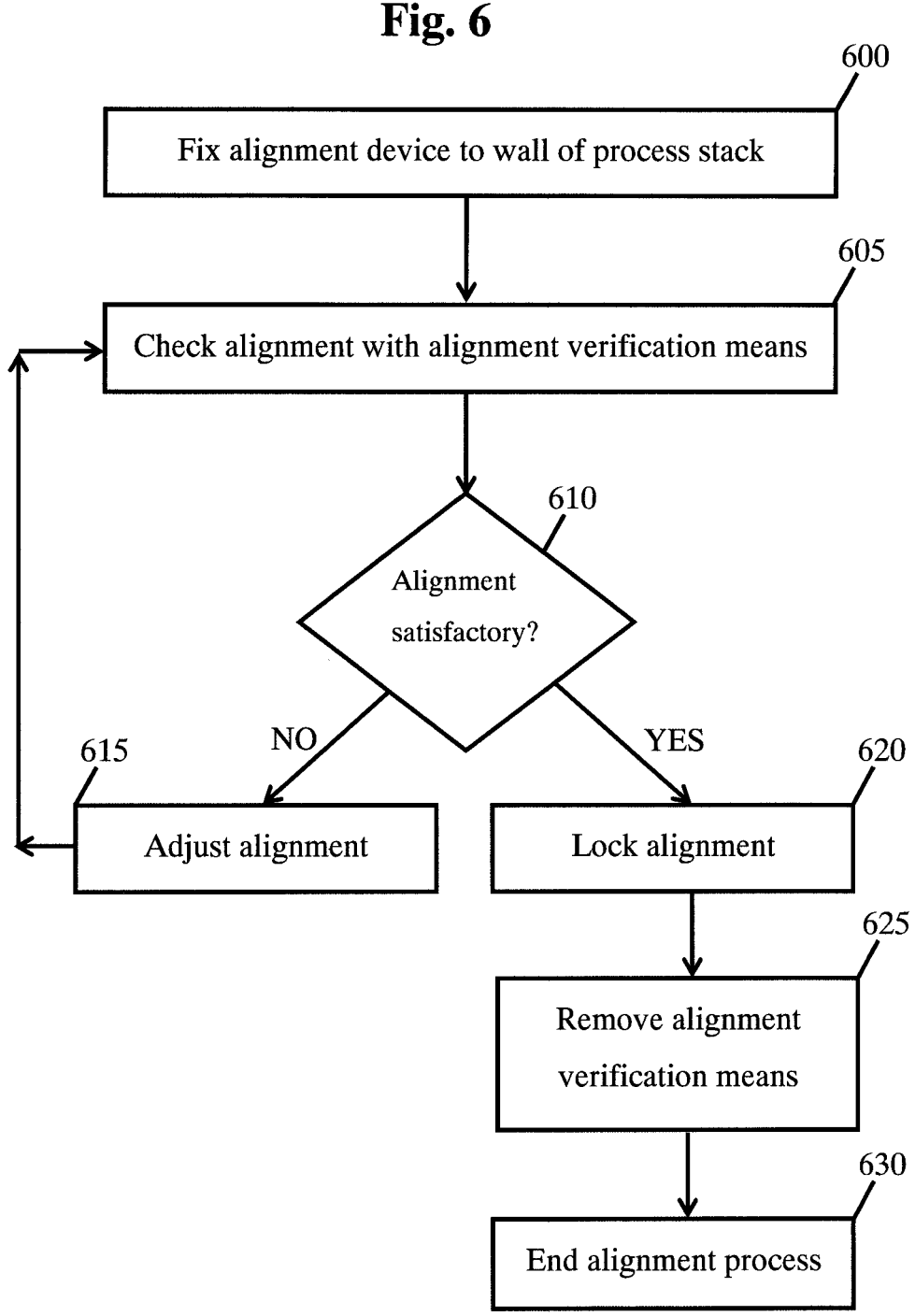

ALIGNMENT DEVICE AND TRANSMITTER/RECEIVER SYSTEM WITH TWO ANGULAR DEGREES OF FREEDOM

CROSS REFERENCE TO RELATED APPLICATIONS

This application claims priority under 35 U.S.C. § 119 to United Kingdom patent application No. GB 1414081.8 filed on Aug. 8, 2014, which is incorporated herein by reference in its entirety.

FIELD OF INVENTION

This invention relates to apparatuses and methods for the alignment of a source and receiver. In particular, the invention has applications in circumstances where the alignment tolerance for successful transmission is relatively small, such as in laser spectroscopy, among other things.

BACKGROUND

In a wide variety of systems, it is necessary to align a transmitter and receiver with respect to one another such that the output of the transmitter is successfully detected at the receiver. As an example of this, a mechanism or device may be provided for the alignment of system components along a line of sight. The alignment device may be coupled to the transmitter or to the receiver, or in some cases multiple co-operating alignment devices are provided, one for each transmitter and receiver. An alignment device associated with a transmitter aligns the line of sight through the alignment device and onto a given target point, area or aperture for receipt by a receiver. The receiver may be located at a fixed distance from the origin, this being defined as the starting viewpoint along the line of sight; i.e. the point, of emission of the transmitter. The transmitter emits one or more of material, electromagnetic waves and acoustic waves towards the receiver. The receiver includes a detector that is capable of detecting the emitted material, electromagnetic waves and/or acoustic waves. The detector generates a signal that is proportional to at least one property of the incident emission, such as intensity. However, many detectors have a limited field of view and any material, electromagnetic waves and/or acoustic waves that fall outside the field of view will not be detected. Such emissions represent a loss of signal. Loss of signal is undesirable and so in many systems it is desirable to maximise the amount of emission that falls within the field of view of the detector. The region within the detector's field of view may be referred to as a 'target' or 'target region'.

One example of a system requiring precise alignment is an industrial gas analyser system for performing laser absorption spectroscopy. In such a system, a laser beam source (transmitter) can be mounted onto one side of an industrial process gas pipe or duct or chamber to point towards a receiver aperture (target) on another part of the pipe, duct or chamber, such that the laser beam travels across the process pipe, duct or chamber (and hence through the process gas) and enters the aperture. The receiver, which incorporates a light detector, generates a signal that is usable for analysis purposes of the contents of the process gas. Gas measurements using tunable lasers, which are scanned across gas absorption lines in order to obtain useful parameter information such as the fractional component of the gas of interest or process temperature information, may typically be used to optimise and control production processes, combustion processes or monitor pollutants for continuous emission monitoring systems (CEMS) and hence are important for minimising pollution from industrial processes and optimal usage of finite natural resources.

In this exemplary context, an alignment device may alternatively or additionally be used at a receiver end of the line of sight, to align the receiver and detection means with the laser light source. In addition, one or more alignment devices could also be used to align a laser light source and/or receiver, or light source and detector combined unit with a retro-reflector located at another location within the duct.

A number of alignment devices already exist that allow adjustment of the pointing direction of a line of sight. For discussion of these devices, it is convenient to visualise a line of sight as the direction of a unit vector a that is normal to a given plane of reference of the alignment device. FIG. 1 illustrates the principle: as the reference plane 100 is rotated in space about either of the two orthogonal axes x, y contained within the reference plane 100, the line of sight will alter its pointing direction in space in either azimuth or elevation. The third rotational degree of freedom is given by rotating the reference plane 100 about the line of sight itself. This does not result in the line of sight changing its pointing direction in space, unless the line of sight is not normal to the plane of rotation in the first instance. In practice, however, this idealisation does not hold for existing alignment devices as adjustment of the pointing direction causes some translation of the line of sight with respect to the centre of rotation, in which case the line of sight will describe a cone as the plane is rotated, which is undesirable. This is inevitable in any real world system doe to mechanical tolerances.

In the field of optics, kinematic mounts are often used for altering the angle of beam steering mirrors or other optical components. These mounts have two rotational degrees of freedom and the kinematic design means that they are not over or under constrained, giving a highly deterministic and repeatable movement. However, this kinematic design requires that the optical component cannot be rotated about its centre meaning that any adjustment in rotation also gives a translation, effectively moving the apparent origin of the beam, in fact kinematic mounts are generally used in pairs to give both angular and translational control of optical beams.

Another problem with kinematic mounts is that they are difficult to lock into position due to their precise nature. For the applications for which they are designed, predominantly laboratory conditions, this is acceptable, but they are not suitable for industrial applications where high levels of vibration and large temperature changes are often present.

Some industrial gas analysers use a large cross-section elastomeric component such as an o-ring 200 to provide both a spring and a seal, as shown in FIG. 2. O-ring 200 is differentially compressed using an adjustment means which may be, for example, four nuts and bolts 205 between a mounting flange 210 and a fixed base flange 215, such that the angle of the plane of mounting flange 210 can be altered relative to the plane of the fixed base flange 215. The apparatus can be locked in a desired configuration using, for example, a further four screws (not shown) driven against base flange 215, giving one advantage for industrial use. Other suitable configurations for the adjustment means will be readily apparent to a skilled person having the benefit of the present disclosure.

A drawback of the alignment device of FIG. 2 is that the point of rotation of mounting flange 210 is indeterminate. When the adjustment means is adjusted, there is no guarantee that the centre of rotation will lie on the axis of the alignment device due to many variable mechanical stresses and frictions between parts. Also, if all four nuts and bolts 205 are driven equally in the same direction, no rotation occurs and o-ring 200 is simply compressed or relaxed uniformly. This changes how the alignment device of FIG. 2 subsequently responds to any given adjustment. This change of response according to the current state of compression of the o-ring makes it difficult to consistently achieve a reliable alignment using an alignment device such as shown in FIG. 2.

Another drawback of the alignment device of FIG. 2 is that, over time, the adjustment device can become solid or slack at the extremes of o-ring compression. Where the alignment device is deployed as part of a process gas analyser, a slack o-ring can cause a gas leak. In addition, elastomeric components are subject to creep over time, which can lead to a gradual change in the line of sight and hence cause the system to become misaligned.

Moreover, several factors in the design of the alignment device of FIG. 2 inherently limit the range of adjustment. The use of an elastomeric component (o-ring 200) tends to give a restricted amount of travel, even in the case of o-rings having large cross sections. Also, the nut and bolt adjuster arrangement becomes unusable as the angle between mounting flange 210 and base flange 215 increases. In practice, these factors limit the angular adjustment of the line of sight to within a cone with a half angle of approximately 1 degree when using an alignment device such as shown in FIG. 2. It is also necessary to use a large cross-section elastomeric component to give an acceptable range of adjustment and this exacerbates the problem of creep associated with elastomers mentioned above, potentially causing drift in stability in the long term.

Another known alignment device that is used on industrial gas analysers is the bellows arrangement shown in FIG. 3. This arrangement includes bellows 300, adjustment and locking nuts 305, mounting flange 310 and base flange 315. A standard flange seal 320 is provided to seal the interface between mounting flange 310 and base flange 315. Flange seal 320 may be, for example, an o-ring or gasket.

Bellows 300 can be used to account for misalignment in couplings between rotating shafts and the bellows concept has been adapted for use to adjust the line of sight of optical devices. The bellows 300 has no elastomeric, or indeed, any, spring and so once the adjustment and locking nuts 305 are slackened, the system is unconstrained until re-locked into a given position. This means that locking it without, at the same time changing its position is difficult. The bellows arrangement of FIG. 3 suffers from the same indeterminacy of the centre of rotation as the elastomeric spring design shown in FIG. 2, for the same reasons as outlined above. Again, if all adjustment and locking nuts 305 are moved in one direction equally, the bellows 300 simply compresses or extends without rotation, changing its response characteristics. The bellows 300 inherently gives a greater range of adjustment than an elastomeric spring like o-ring 200, but this is limited by the fact that the studding on which it is supported can only work with a limited angle between mounting flange 310 and base flange 315.

Another drawback of the bellows concept is that the studding which carries the adjusting and locking nuts 305 must also be a strong enough cantilever to carry the weight of anything attached to the alignment device because the bellows itself is not a structural element. This tends to make the entire device relatively large and bulky.

In view of this, it is clear that there remains a need for an alignment device that can predictably and repeatably align a transmitter and receiver system.

SUMMARY

Aspects of the invention are set out in the accompanying claims.

A first aspect provides an alignment device, comprising:
a mount for receiving a transmitting or receiving apparatus;
a housing for the mount that is arranged to allow rotation of the mount within the housing, wherein the housing comprises a translation restraining device for restraining translation of the mount during rotation; and
an adjustment device for adjusting the alignment of the mount within the housing, for alignment of a received transmitting or receiving apparatus with a desired transmission direction.

A second aspect of the invention provides a system, comprising:
a transmitter;
a receiver; and
an alignment device according to the first aspect of the invention, wherein one of the transmitter and receiver is secured in the mount of the alignment device.

A third aspect of the invention provides a method of aligning a first apparatus with respect to a second apparatus, comprising:
a) securing a first alignment device, according to the first aspect of the invention, to a first surface of an object;
b) securing either the first apparatus or the second apparatus in the mount of the first alignment device;
c) checking the alignment between the first apparatus and the second apparatus using an alignment verification means;
d) adjusting the alignment of the first alignment device;
e) repeating steps c) and d) until a satisfactory alignment of the first and second apparatuses has been achieved; and
f) locking the first alignment device in position once a satisfactory alignment has been achieved.

BRIEF DESCRIPTION OF THE DRAWINGS

Embodiments of the present invention are described below, by way of example only, with reference to the following drawings in which:

FIG. 4(b) shows a schematic diagram of a second alignment device according to an embodiment of the invention;

FIG. 4(c) shows a schematic diagram of a third alignment device according to an embodiment of the invention;

FIG. 5 is a schematic diagram of a typical tunable laser cross stack absorption system mat an alignment device according to embodiments may be part of; and FIG. 6 is a schematic diagram of an adjustment method according to embodiments.

DETAILED DESCRIPTION OF EMBODIMENTS

Figure 1:
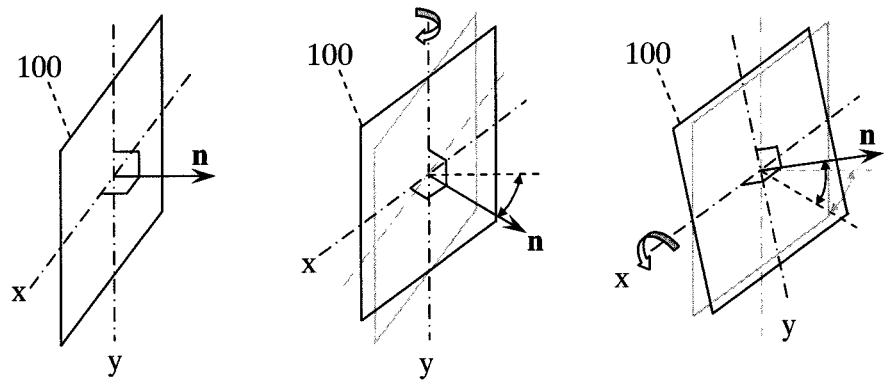
FIG. 1 is a schematic illustration of adjustments of two rotational degrees of freedom to alter the direction of an optical path in azimuth and elevation.
Figure 2:
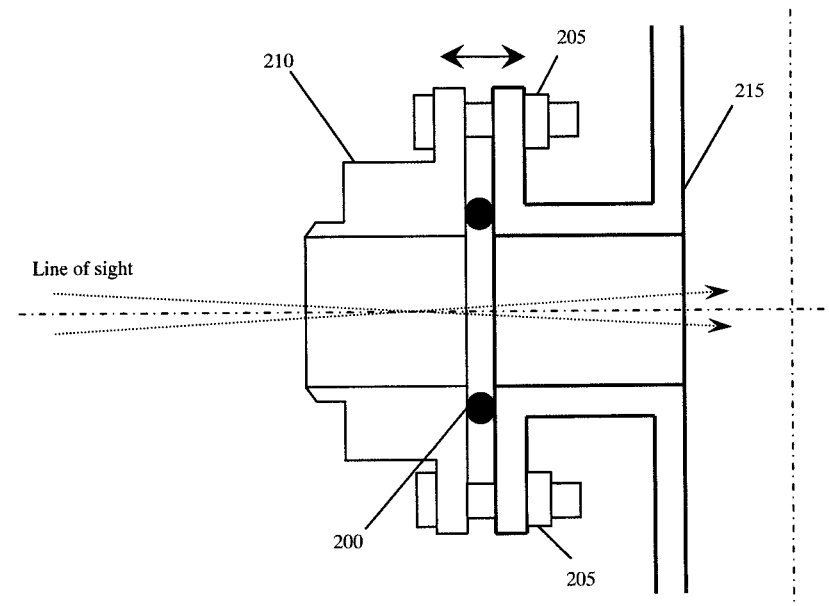
FIG. 2 is a schematic diagram of a prior art alignment device that uses an elastomeric spring.
Figure 3:
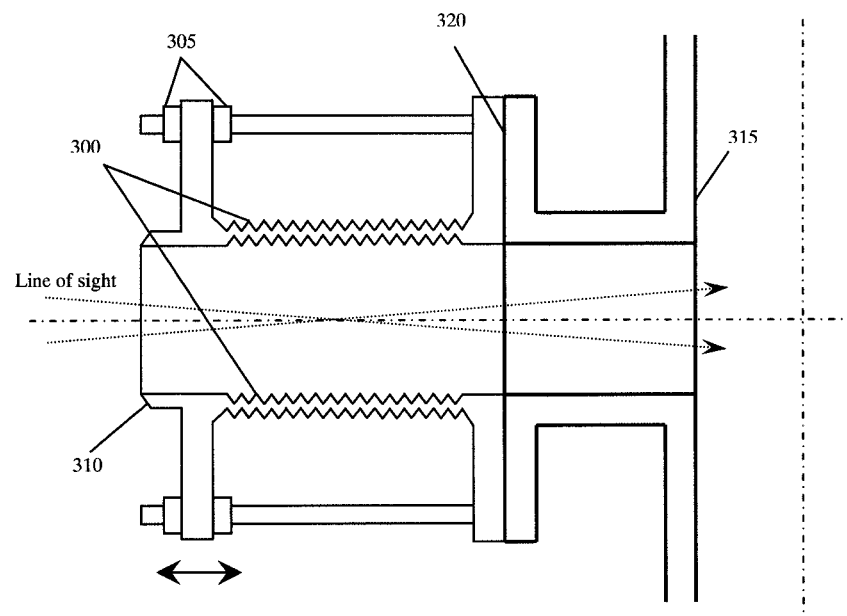
FIG. 3 is a schematic diagram of a prior art alignment device that uses a bellows.
Figure 4A:
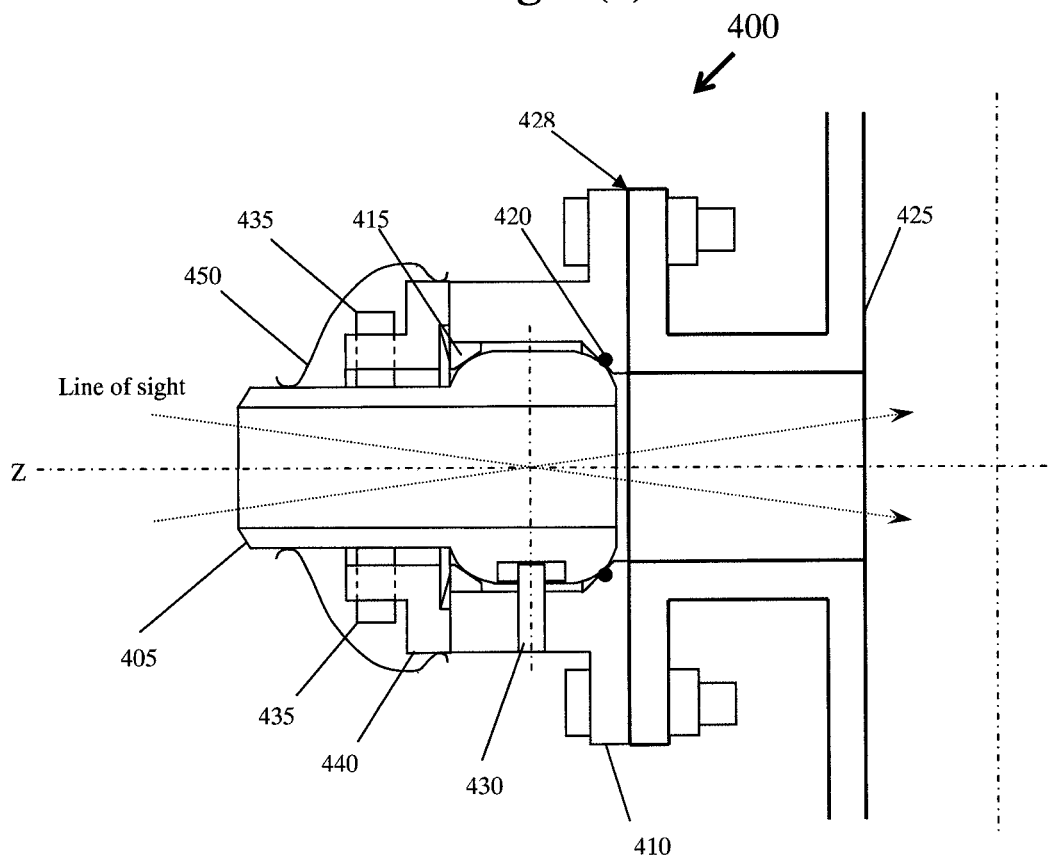
FIG. 4(a) shows a schematic diagram of a first alignment device according to embodiment of the invention.

Alignment devices 400, 400' and 400" according to certain embodiments are shown is FIGS. 4 (a), (b) and (c). FIG. 4(a) shows a first embodiment and FIGS. 4(b) and 4(c) show cross sectional schematics of second and third embodiments 400' and 400", respectively. Common features in all three embodiments are given like reference numerals and, in the interests of brevity, are described in detail only once in the following detailed description. References in the following detailed description to 'alignment device 400' are understood to apply equally to alignment devices 400' and 400" unless otherwise expressly indicated.

Alignment device 400 is discussed in the following generic description in the context of optical alignment of a transmitter and a receiver. In some embodiments, this is a direct "line of sight" optical alignment, but it will be appreciated that an optical path may include reflective surfaces, so it is not essential for a direct line of sight. The alignment device has a number of applications in systems where alignment control can help to achieve accurate measurement of transmission through a medium, such as for use in laser spectroscopy in an industrial gas analyser system. However, it will be appreciated that alignment device 400 is not limited to use with a laser spectroscopy gas analysis system. In particular, alignment device 400 will find utility in any system in which it is desirable to align one apparatus with respect to another in order to enable transmission between the two apparatuses. Moreover, the transmission is not limited to optical radiation; electromagnetic radiation, acoustic and matter transmissions are also contemplated. The transmitter may be configured to emit one or more of optical radiation, electromagnetic radiation, acoustic transmissions and matter transmissions and the receiver may be configured to detect one or more of optical radiation, electromagnetic radiation, acoustic transmissions and matter transmissions. Typically the transmitter and receiver are arranged substantially in opposition to one another, although reflected signals (such as electromagnetic radiation or audio transmissions) are also envisioned.

Alignment device 400 includes a mount 405 that sits within a housing 410. In the illustrated embodiments, mount 405 comprises, a hollow body having a central through bore whose longitudinal axis defines a "line of sight" for an optical transmitter or receiver when connected to the mount. In the illustrated embodiments, a tubular first part of the mount 405 that includes a connection point for a transmitter or receiver has a circular cross-section, but this is not essential, and tubes and non-tubular mounting portions having any other cross sectional shape are also contemplated for mount 405. In some embodiments, the cross-sectional shape of a central through bore of mount 405 is chosen such that it co-operates with a device (e.g. a tunable diode laser) that is to be held in mount 405. However, the mount 405 may have a threaded end connection or another interconnection or coupling means 455 on an interior or exterior surface for connecting devices or device holders. The coupling means 455 for connecting to devices may also be separate to mount 405 and integrated onto mount 405 by suitable coupling means and sealed to mount 405 if required by sealing means 460 such as at least one o-ring. The coupling means may also include sealing means 465 such as an o-ring or gasket for sealing to the connecting device.

Housing 410 is secured to base flange 425 by a securing means, such as by using nuts and bolts. Housing 410 may have different dimensions and securing means to suit various base flange 425 attachment arrangements. Additionally, housing 410 may comprise more than one component to facilitate the integration onto base flange 425. A suitable securing means such as secured bolts or a threaded engagement means will readily be chosen by the skilled person. Optionally, a conventional flange seal 428 may be provided between housing 410 and base flange 425 if required. It will be readily apparent to a skilled person having the benefit of the present disclosure that some of the features described here could be integrated into fewer or more components for convenience or for varying end user requirements, whilst still fulfilling the same essential functions described. For example, housing 410 and collar 440 could be integrated into a single component and a suitable constraining means such as a circlip or attachment ring (not shown) could be used to stop translational movement along the Z-axis.

As illustrated in FIG. 4, the end of the mount 405 that is proximate to the base flange 425 is fashioned such that it contains a set of curved bearing surfaces. The curved bearing surfaces of the mount 405 are preferably shaped such that they act to centre the longitudinal axis of the mount within housing 410. In one embodiment, each of the curved bearing surfaces is part of a spherical surface having its centre of curvature at the centre of rotation of the mount. In the illustrated embodiment, each of these bearing surfaces is defined by a spherical sector centred at the same point on the longitudinal axis of the alignment device, but other suitable smooth, continuous, curves (such as parabolic) may be used instead. Various, appropriate materials may be used for the mount 405, housing 410, bearing 415, collar 440 or other components for optimal application suitability. The criteria for choosing appropriate materials may include one or more of the following: thermal expansion coefficient, chemical resistance, mechanical strength, wear resistance, coefficient of friction, material compatability, optical properties (such as emissivity and/or reflectivity) and achievable surface finish. Typically, a ferrous alloy such as stainless steel of varying composition may be chosen for mechanical strength and/or corrosion resistance for any surfaces exposed to the process fluid or ambient conditions. Low thermal expansion coefficient stainless steel alloys may be chosen for applications where large temperature changes are seen. Ideally, low friction contact (due to material and surface finish) with high wear resistance should be present at any sliding surfaces such as at the interface of the bearing 415 and mount 405 and the housing 410 and mount 405. Optical properties influenced by material and surface finish may be important due to the generation of background radiation and stray reflections, which may cause interference in an optical measurement.

Various, appropriate surface coatings may be used for the mount 405, housing 410, bearing 415, collar 440 or other components for optimal application suitability. The criteria for choosing appropriate surface coatings may include one or more of the following: thermal expansion coefficient, chemical resistance, mechanical strength, wear resistance, coefficient of friction, material comparability, optical properties (such as emissivity and/or reflectivity) and achievable surface finish. Examples of these are polytetrafluoroethylene (PTFE) for reduced friction, PTFE or tantalum for increased chemical resistance and titanium nitride TiN for increased wear resistance. The coatings are ideally expansion coefficient matched to the substrate to minimise internal tension and risk of delamination. In addition, specular reflectivity may be reduced by increasing the surface roughness and/or decreasing the intrinsic reflectivity of the coating material at the wavelength range of interest.

The curved end of the mount is secured within housing 410 such that it cannot translate in any of the x, y or z directions. The curved end of the mount is secured by translation restraining means 415, which in one particular embodiment comprises as a spring and bearing. However, translation restraining means 435 is not limited to this, and any suitable means known to the skilled person that removes any free play of mount 405 can be used for translation restraining means 415. For example, the translation restraining means may alternatively comprise a set of bearing surfaces arranged to cooperate with the curved bearing surfaces of the body portion of the mount. The curved bearing surfaces bear against the translation restraining means 415. This arrangement allows the necessary rotation of mount 405 to facilitate beam alignment whilst simultaneously preventing translation of mount 405 with respect to housing 410.

In some embodiments, an optional flexible, sealing means is provided. This could be located anywhere within housing 410. For example, alignment device 400 has a flexible sealing means 420 located at the curved end of mount 405 that is proximate to base flange 425, and alignment, devices 400' and 400" both have a flexible seating means 420 located at the curved end of mount 405 that is distal from base flange 425. Flexible sealing means 420 may be, for example, an elastomeric seal or metal seal. Embodiments having multiple seals are also contemplated. These embodiments may have multiple elastomeric seals, multiple metal seals or a combination of at least one elastomeric seal, and at least one metal seal. Flexible sealing means 420 is placed within a suitable feature within housing 410 and/or collar 440 and/or mount 405. A suitable feature may be a recess. Wherever it is located, flexible sealing means 420 is placed such that translation restraining means 415 acts to push the mount 405 against the flexible sealing means 420, and preferably to push the spherical base portion of the mount 405 against the flexible sealing means 420. This provides a gas tight seal between mount 405 and housing 410 and/or collar 440. This is desirable where alignment device 400 is deployed in an industrial gas analyser system, since it is desirable to prevent process gas from escaping the process stack and it is desirable to know which gas is being analysed. Specifically, flexible sealing means 420 prevents fluid leaking either into or out of the process stack whilst alignment device 400 is in use. As noted above, in some embodiments, the device includes multiple flexible sealing means such as one or more elastomeric seals and/or one or more metal seals or combinations thereof, in order to increase sealing efficiency and/or to allow a seal to be maintained in case of an individual seal failure. Such multiple sealing is not usefully employable in the case of the discussed prior art.

In some embodiments, such as the embodiment illustrated in FIG. 4(c), alignment device 400" includes an optional purging means such as a purge fluid inlet 475 or 480 and outlet 475 or 480 to allow the internal volume of alignment device 400 to be flushed by a purge fluid, such as nitrogen or air. Alternatively, the inlet or outlet may be either end of the mount 405. One or more of inlet 475, 480 or either end of mount 405 may be blanked off as required. As a further alternative, the internal volume may be sealed and/or the internal volume may be scrubbed (chemically filtered) using a scrubber father than purged to eliminate any unwanted compounds. Although no purging means is shown in either of FIG. 4(a) or 4(b), it will be appreciated that alignment device 400 and/or alignment device 400' may include purging means as described above.

As shown in FIGS. 4(b) and 4(c), alignment device 400' and alignment device 400" additionally incorporate at least one optical element 485. Optical element 485 is optional and alternative non-illustrated embodiments of alignment device 400' and/or 400" that do not include any optical elements) are also contemplated. In addition, although optical element 485 is not shown in FIG. 4(a), it will be appreciated that alignment device 400 of FIG. 4(a) may include at least one optical element as described in the following.

Optical, element 485 may typically be composed of any combination of at least one of a window, diffuser, lens and reflective element, any of which may be used to re-direct and/or re-shape the beam. The reflective element may be a reflective surface. The lens may be a refractive lens. Any window used may have a wedge shaped cross section. Any of the aforementioned optical elements may have an anti-reflective coating to minimise reflective losses and also to minimise the interference effects from etalons (optical fringes) in laser based measurement systems. This at least one optical element may be positioned anywhere within the alignment device including, for example, within mount 405 and/or housing 410 and/or connecting means 455. Due to the presence of particulates and potential contaminants, as well as thermal issues, any optical element in contact with the gas may need to be purged. Alignment device 400 may also incorporate suitable purging means for the at least one optical element including inlet and outlet purge means or may be inserted within a larger, separate purged feature. In some embodiments, the optical element purge means may be the same as the internal volume purge means (for example 475, 480, or either end of the mount 405).

The purge fluid may be monitored using a fluid flow device and/or a flow alarm and/or a pressure alarm to indicate cessation or fluctuation of purge. The flow alarm may be a pressure monitoring system. In the case of spectroscopic absorption measurements, such purge fluid or scrubbed atmosphere will be optimally chosen so as not to absorb electromagnetic radiation in the wavelength band of interest.

In some embodiments, alignment device 400 also includes a rotational restraining means 430 which prevents rotation of the tube about its own axis. This only leaves two rotational degrees of freedom, giving azimuth and elevation adjustment for the line of sight which is, nominally, along the tube axis. In the illustrated embodiments, rotation restraining means 430 comprises a protrusion or pin that engages within an indentation or narrow slot near or at the curved end of the mount 405 (alignment device 400, FIG. 4(a)) or it may comprise a protrusion in the mount 405 engaging in a slot in the housing 410 or collar 440 (alignment devices 400' and 400", FIGS. 4(b) and 4(c)). However, other rotational restraining means known to the skilled person may be used instead of or in addition to a pin/slot configuration.

The alignment of mount 405 relative to housing 410 of alignment device 400 is adjusted and locked by adjustment means 435. In the illustrated embodiments, adjustment means 435 comprises four screws or bolts that are equally spaced around the circumference of the tubular mounting portion seated in a collar 440 that extends for some length parallel to the longitudinal axis. The collar 440 may be secured to the housing 410 by appropriate securing means such as by using bolts into threaded holes in the housing 410 or vice versa. In some embodiments, the collar 440 may be sealed by suitable sealing means 470 to the housing 410, such as by using an elastomeric or metal o-ring or gasket. In one embodiment collar 440 includes connection means for releasably connecting a transmitting or receiving apparatus to mount 405. The four adjustment screws 435 in the collar 440 include a first pair of opposed screws and a second pair of opposed screws, where the second pair is arranged at 90 degrees to the first pair around the circumference of the tubular mounting portion. Other adjustment means known to the skilled person can be used instead of or in addition to screws or bolts. In addition, in some embodiments, at least one goniometric scale may be added so that the angle of mount 405 may be indicated for at least one of the azimuth and elevation. This may take the form of graduated marks on the adjustment screws with a spacing that corresponds to a given angular increment at a given position, for instance. The adjustment screws act in a line perpendicular to the longitudinal axis Z of alignment device 400 when the device is centralized. Flat surfaces may be provided on the tube for the screws to act upon, meaning that adjustment in one angle does not alter that set in the other. The screws can only push, meaning that the opposite screw must be wound clear when its counterpart is pushing mount 405. When the desired position is reached, the unwound screw is wound back, locking the device without altering its position. It will be appreciated that more or fewer than four screws can be provided, and as few as two adjustment screws could be used in an arrangement that allows both push and pull via the same adjustment means.

Optionally, the screws may be chosen to have a point contact with a domed end or to have a gimble mounted, pivoted flat end in order to increase the contact surface area. This reduces the risk of a high stress point of contact and hence reduces the risk of damage to the contact surface or mechanical creep.

Optionally, the screws may also constrain springs onto a fixed flat surface on the tube. Initially, all the screws are loosened and then the orientation of the tube is adjusted to the optimum position using two of the screws in orthogonal directions and then locked by securing with the other two screws. The locking of the screws into position or other suitable alignment means may optionally be reinforced by suitable adhesive means to minimise any loosening due to mechanical creep or vibrational effects.

In some embodiments, a flexible, protective sheath 450 may be used to cover the gap between the mount 405 and collar 440, so as to prevent ingress of environmental contamination such as particulates or fluids. In some embodiments, such as those shown in FIGS. 4(a) to 4(c) the protective sheath may also cover the adjustment means 435.

In some embodiments, the alignment device 400 may incorporate or allow to be temporarily or permanently attached, an alignment verification means (not shown). This alignment verification means serves to verify that the origin and target are correctly aligned before securing into position. The alignment verification means may be optical or acoustic or other suitable means; for example, it could take the form of an optical scope temporarily inserted into the mount aligned along or parallel to the central axis of the mount focusing on an appropriate feature on the target. In addition, the target may also incorporate an enhanced feature, such as an optical or acoustic source or reflector to facilitate the alignment of the origin and target. This can involve a secondary optical source of divergent light built into a transmitter's alignment device, and a secondary detector built into a receiver's alignment device for receiving a part of the divergent beam. The intensity of the received beam can be measured during adjustment to identify the alignment that achieves optimal measured intensity, for an initial manual or automatic detection of approximate alignment.

Fine adjustment can then be carried out using the primary optical source, such as a laser in the case of a laser spectroscopy system. A feedback signal from the receiver can be used to identify optimal alignment, and can be used for automated control of alignment and/or automated determination of optical alignment.

Alignment device 400 provides a very intuitive process to adjusting the azimuth and elevation angles of the line of sight. Specifically, adjustment in only two orthogonal angular degrees of freedom, e.g. azimuth and elevation, is permitted, where the adjustment of one angle neither causes a change in the other nor gives any significant translation of mount 405. This makes it possible to set each angle independently of the other, greatly simplifying the alignment process. Furthermore, a set alignment position is not altered when adjustment means 435 are used to lock mount 405 in position, meaning that the process of locking mount 405 in the desired position does not affect alignment Mount 405 is then securely fixed in the aligned position for as long as desired.

In contrast to prior art alignment devices, alignment device 400 also gives a rotation about a single known point. This facilitates easy alignment and also ensures reliable, repeatable alignment. This is because the line of sight of alignment device 400 always passes through the centre of rotation, meaning that adjustment of pointing direction in azimuth or elevation does not produce any translation of the origin of the line of sight.

Additionally, the adjustment mechanism itself is not limited by the angle of the tube and so large angular adjustment ranges can be achieved. The device may be compact and the tube gives a highly rigid mechanical mounting that is resistant to mechanical disturbance, e.g. due to vibrations. This makes alignment device 400 highly suited to use in a rugged environment such as is found around a process stack.

Figure 5:
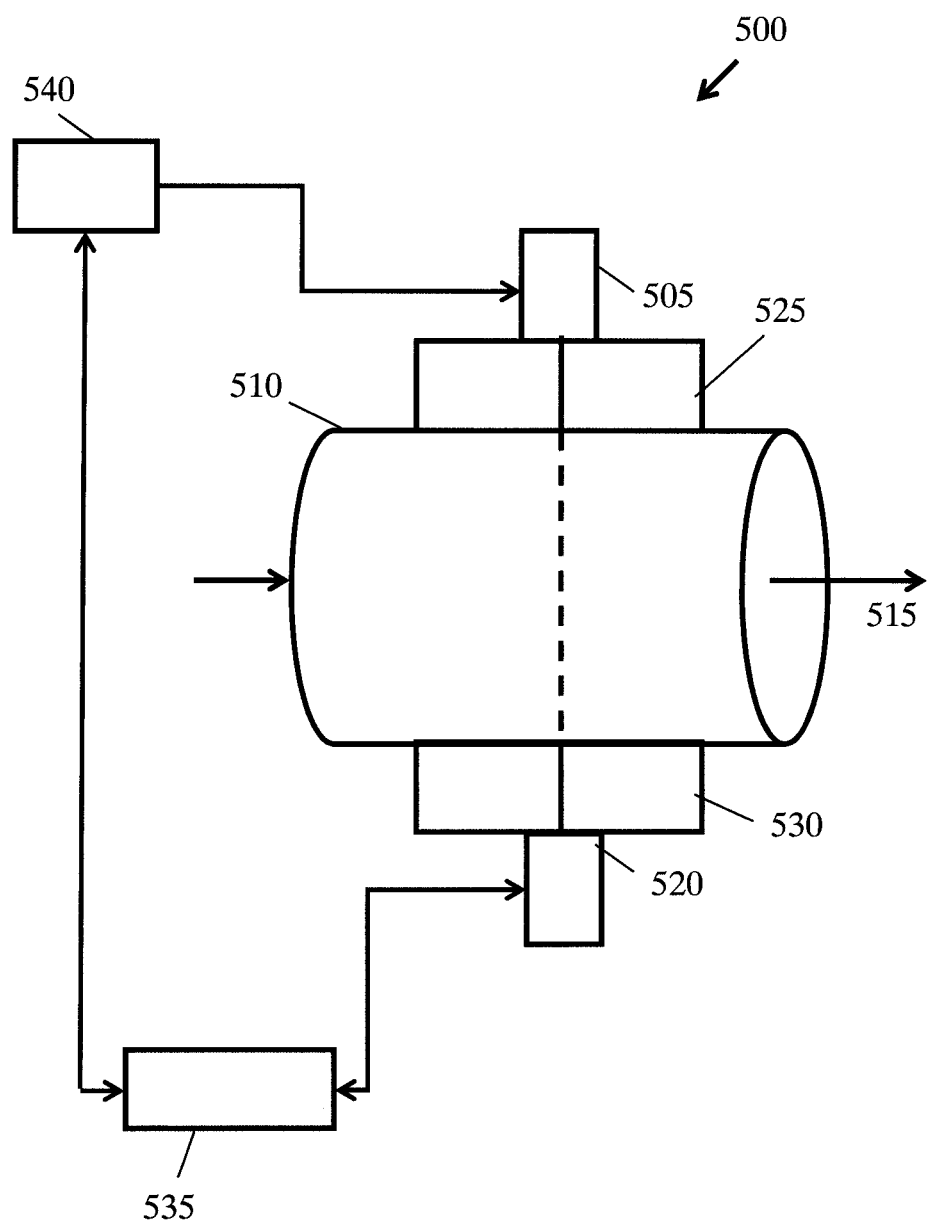

With reference to FIG. 5, use of an alignment device according to embodiments described herein will now be illustrated in the exemplary context of a cross stack gas measurement for example, for carbon monoxide (CO) monitoring for a combustion system. Combustion systems typically will burn carbon (coal) or hydrocarbon (natural gas and oil) based fuel using air (oxygen) as the oxidant. The heat produced by the reaction may be used to create steam to drive turbines for electricity generation or for process heating. In either case, the desire for minimal environmental pollution and wastage of natural resources and for economical operation require close control of the efficiency of the combustion process. If the combustion mixture has too much excess oxygen ($O_2$), all of the fuel will be burnt, but some heat will be wasted by heating up excess, unreacted air. This condition may be monitored by using oxygen monitoring equipment such as a laser gas analyser or alternative technology such as in-situ or extractive zirconia or extractive paramagnetic technology. The alternative condition that may be present is too little excess oxygen. In this case, not all of the fuel is completely burnt and therefore, not all of the potential heat is generated. The early symptom of incomplete combustion will be CO generation, which may be measured by an in-situ tunable laser cross stack system or other extractive means such as by using a catalytic sensor or infrared based absorption system. For a controlled combustion process therefore, ideally, both the $O_2$ and CO levels should be monitored and manual or automatic feed-back, systems used to control the amount of fuel and air supplied to the process. The following description will now concentrate on illustrating the device for use on a CO cross stack measurement using a tunable laser diode system. It will be readily understood by the skilled reader that this example application of the invention is purely exemplary, and that other uses of alignment devices according to embodiments described herein are possible.

FIG. 5 illustrates a typical cross stack arrangement 500, whereby the tunable laser diode-source 505 is positioned on one side of a stack 510 having process gas 515 flowing through it. A combined laser light receiver and detector 520 is situated on the opposite side of stack 510. A first alignment device 525 according to embodiments described herein is used to align source 505 and a second alignment device 530 according to embodiments described herein is used to align detector 520. Other embodiments in which only one alignment device is used, either to align source 505 or detector 520, are also contemplated. Detector 520 is communicatively coupled to signal processing electronics 535 which are configured to process the output signal from detector 520 in order to determine e.g. a concentration of a particular measurand in the process gas. Suitable processing electronics are well known in the art and will not be described in further detail here.

Processing electronics 535 are also communicatively coupled to laser drive electronics 540, which are in turn communicatively coupled to tunable laser diode source 505. Laser drive electronics 540 are configured to operate tunable laser diode source 505 in the following manner.

Laser drive electrodes 540 operate the tunable laser diode at a particular wavelength. The tunable laser diode line width is much less than fee width of the absorption line that it is measuring. The tunable laser diode is typically maintained at a fixed, controlled temperature and fee laser output wavelength is tuned or scanned across the wavelength range of interest by varying the current applied to the laser diode. As the laser light beam passes through the process gas, some of the beam will be attenuated at the absorption wavelengths corresponding to CO if any CO is present, as described by the Beer Lambert law. The amount of absorption will depend on ambient process conditions (pressure and temperature), path length, fractional concentration of CO and the extinction coefficient (fundamental absorption strength of the absorption line). From the amount of light absorbed, for a calibrated system, the fractional quantity of CO in the process gas may be deduced. The absorption profile may typically be measured by using a direct absorption system or wavelength modulated system, both of which are known to those skilled in the art and will, not be described further here. Typical cross stack path length measurements may vary from about one metre to several tens of metres. Appropriate laser diode sources and light detectors may be chosen with regard to the desired working range and ambient conditions for the analyser and path length. As previously described, due to the presence of particulates and potential contaminants, as well as thermal issues, any optical element in contact with the gas may need to be purged. This purge gas will typically be nitrogen or air, but could also be any other suitable (preferentially non-CO containing) purge gas. In this case, the purge gas will typically be input into mount 405 via inlet 475, sweep past optical element 485 and exit into the process stack (480 being blanked off).

Alignment of a light source such as a tunable laser diode source 505 (origin) and light detector 520 (target) may not be a trivial task, if the stack is several tens of metres wide and the respective base flanges that source 505 and detector 520 are attached to are not perfectly aligned either in angle or height, as is normally the case. This may necessitate the use of an alignment verification means as discussed earlier and also, in some cases, may alternatively or additionally require the incorporation of a diffusive element (diffuser) into the optics of the device. This is particularly the case for large path lengths (tens of meters). A diffuser will normalise the laser beam intensity over a larger area, such that it will be less critical to exactly align laser source 505 with detector 520. The diffuser will also enhance immunity to vibrational effects, where a narrower beam might become misaligned with the target for the same angular displacement. The use of diffusers in cross stack measurements is known to those skilled in the art and will not be discussed further here, in one embodiment, a diffuser can be used during a preliminary alignment step to achieve an approximate alignment using a wider beam, and then removed for final adjustment and use in laser measurements.

Alignment device 400 will typically be fixed onto a base flange on the process stack wall. In some embodiments bolts are used to secure alignment device 400 to the process stack wall, although other securing means can be used instead. Alignment device is then adjusted and aligned with the target. This may involve the use or insertion of an alignment verification means as discussed earlier. The following will give an illustration of the alignment procedure, but is intended merely as an illustration of one potential alignment method and not intended as a limiting case.

With reference to FIG. 6, in step 600 an alignment device according to embodiments described herein is fixed to the wall of a process stack. In some embodiments bolts are used to fix the alignment device to the wall of the process stack. However, any fixing means capable of reliably fixing the alignment device to the wall of the process stack can be used. By avoiding the need for precise alignment during this initial step, the initial fitting of the alignment device is relatively fast.

Once alignment device is secured in place, in step 605 an alignment verification means is used to check the alignment of the transmitter with respect to the receiver and in particular the alignment of the origin of the transmitter (i.e. the point of emission) with respect to a target region of the receiver. In the illustrated embodiment, the transmitter is a tunable diode laser and the receiver is a photodiode, but this is not essential and other transmitter and receiver means can be used instead.

The alignment verification means will be chosen by the skilled person according to the specifics of the system that is being aligned, but will in general comprise some means that is readily detectable by the person or automated system that is performing the alignment. In the illustrated case of an industrial process gas analyser, the alignment verification means can be a visible laser light source or other suitable visible feature. The output of the transmitter itself may be used as the alignment verification means in which case no ancillary alignment verification means is required.

The alignment verification means may be located within the target, along the main axis of the target and is used to check the alignment of the origin and target. In some embodiments, at least one of the transmitter and receiver includes attachment features to allow the attachment of the alignment verification means. The attachment features may comprise any suitable means known to the skilled person such as attachment bolts or screws. Where alignment verification means is a visible laser light source, it is preferable that the laser light source is attached to the transmitter and/or receiver in a manner such that the main optical axis of the transmitter and/or receiver is aligned with the main optical axis of the laser light source. This common main optical axis Is preferably orthogonal to the attachment face.

In this illustrated example in which the alignment verification means emits visible laser light, checking may comprise inspection by eye to determine if the light is visible at the origin (appropriate eye protection must be used when performing a determination by eye using laser light). Alternatively, detection means such as a photodiode may be used to determine if the light is visible at the origin.

To assist the alignment process, a second, complimentary alignment verification means can be used. In the illustrated embodiment the second alignment verification means may comprise an optical scope with cross hairs that is inserted within the origin and along the main axis of the origin. Other suitable secondary alignment verification means will be apparent to the skilled person.

After checking the current alignment with the alignment verification means, in step 610 a determination is made as to whether the current alignment is satisfactory. A satisfactory alignment may be defined as an alignment that Is within a tolerance of the system that is being aligned. In the illustrated embodiment, a satisfactory alignment may be defined as an alignment in which the laser light outputted by the alignment verification means is visible at the origin. In embodiments in which an optical scope is being used, a satisfactory alignment may be defined as an alignment where the cross hairs of the optical scope are aligned with the light output from the target light source. A satisfactory alignment may alternatively be defined by the intensity of the laser light incident on the origin being greater than a threshold intensity, which threshold intensity is defined with respect to the output intensity of the laser light of the alignment verification means. Laser gas analysers typically have a facility to indicate the intensity level of radiation received due to the laser beam at the detector and so a satisfactory alignment may be indicted by means of increased or maximal laser light intensity at the detector when aligned. Other ways of defining a satisfactory alignment will be apparent to the skilled person.

If it is determined in step 610 that the current alignment is not satisfactory then in step 615 the alignment is adjusted. This is achieved by adjusting attachment device 400 in the manner described earlier. Specifically, in the embodiment of FIG. 4 the orientation of the origin is adjusted using adjustment means 435. In embodiments where adjustment means 435 comprises two pairs of orthogonally orientated adjustment screws, these are tightened and loosened in small increments as required in the manner discussed earlier to adjust the alignment Steps 605 and 610 are repeated after each small adjustment until a satisfactory alignment is achieved. At this point, the alignment is complete and in step 620 the position of adjustment device 400 is locked using the adjustment screws.

Following locking, in step 625 all alignment verification means are removed from the system and in step 630 the alignment process is ended. The system is now aligned and ready for use. It will be appreciated mat, in embodiments where the output of the transmitter is used as the alignment verification means, step 625 is omitted.

In some embodiments more than one alignment device is provided. For example, an embodiment in which both the transmitter and receiver have respective alignment devices is contemplated. In these embodiments, step 615 of FIG. 6 is modified such, that adjustment comprises adjustment of at least one of the alignment devices.

Whilst the alignment device described herein has been primarily illustrated for laser beam alignment in a laser gas analyser, it will be obvious to one skilled in the art that the alignment device may also be employed to align alternative arrangements such as non-laser light sources and detectors, acoustic sources and detectors and/or other suitable transmitters and receivers (origins and targets). In addition, since the orientation of the origin, is unaffected by the alignment procedure, embodiments described herein can also be for used for image projection and/or collection.

Numerous modifications, adaptations and variations to the embodiments described herein will become apparent to a person skilled in the art having the benefit of the present disclosure, and such modifications, adaptations and variations are also embodiments of the present invention.

In addition to the embodiments described previously and claimed in the appended claims, the following is a list of additional embodiments, which may serve as the basis for additional claims in this application or subsequent divisional applications.

Embodiment 1: An alignment device, comprising: a mount for receiving a transmitting or receiving apparatus; a housing for the mount that is arranged to allow rotation of the mount within the housing, wherein the housing comprises translation restraining means for restraining translation of the mount during rotation; and adjustment means for adjusting the alignment of the mount within the housing, for alignment of a received transmitting or receiving apparatus with a desired transmission direction.

Embodiment 2: The alignment device of embodiment 1, further comprising a rotation restraining means for preventing rotation of the mount about an axis corresponding to the transmission direction.

Embodiment 3: The alignment device of embodiment 1 or embodiment 2, wherein the mount has a body portion with at least one external curved bearing surface for bearing against the translation restraining means during rotation of the mount within the housing.

Embodiment 4: The alignment device of embodiment 3, wherein the at least one external curved bearing surface comprises paired bearing surfaces on opposite sides of the centre of rotation of the mount within the housing.

Embodiment 5: The alignment device of embodiment 4, wherein the body portion of the mount has two pairs of external curved bearing surfaces for bearing against the translation restraining means.

Embodiment 6; The alignment device of any one of embodiments 3 to 5, wherein each of said at last one external curved bearing surface is a part of a spherical surface having its centre of curvature at the centre of rotation.

Embodiment 7: The alignment device of any one of the preceding embodiments, wherein the mount comprises: a body portion and an attachment collar projecting from the body portion; wherein the attachment collar has connection means for releasably connecting a transmitting or receiving apparatus to the mount.

Embodiment 8: The alignment device of embodiment 7, wherein at least one of the mount, housing, attachment collar and bearing is made of a ferrous alloy.

Embodiment 9: The alignment device of embodiment 8, wherein the ferrous alloy is stainless steel.

Embodiment 10: The alignment device of embodiment 9, wherein the stainless steel has a low coefficient of thermal expansion.

Embodiment 11: The alignment device of any one of embodiments 7 to 10, wherein at least one of the mount, housing, bearing and collar includes a coating on a surface thereof.

Embodiment 12: The alignment device of embodiment 11, wherein the composition of the coating is selected such that a coefficient of thermal expansion of the coating is substantially identical to a coefficient of thermal expansion of the surface on which the coating is located.

Embodiment 13: The alignment device of embodiment 11 or embodiment 12, wherein the coaling includes one or more of polytetrafluoroethylene (PTFE), tantalum and titanium nitride.

Embodiment 14: The alignment device of any one of embodiments 7 to 13, further comprising a flexible protective sheath that is arranged to cover at least the mount and the collar, so as to prevent ingress of environmental contamination such as particulates or fluids.

Embodiment 15: The alignment device of embodiment 14, wherein the protective sheath also covers the adjustment means.

Embodiment 16: The alignment device of any preceding embodiment, wherein the mount has a through bore defining a transmission pathway through the mount for a received transmitting or receiving apparatus, and wherein the adjustment means is adapted to align the transmission pathway with a desired transmission direction.

Embodiment 17: The alignment device of embodiment 2, wherein the rotation restraining means comprises a protrusion that engages within a slot that is present in an outer surface of the mount.

Embodiment 18: The alignment device of embodiment 2, wherein the rotation restraining means comprises a protrusion from the mount that engages within a slot that is present in the housing.

Embodiment 1.9; The alignment device of any one of embodiments 7 to 15, wherein the rotation restraining means comprises a protrusion from the mount that engages within a slot that is present in the housing or the collar.

Embodiment 20: The alignment device according to any preceding embodiment, further including locking means for locking any set alignment position without altering that position, such that the set alignment position of the alignment device is feed until released as required at a later time.

Embodiment 21: The alignment device according to embodiment 20, where the locking means is furthermore adhered in position.

Embodiment 22: The alignment device according to embodiment 20 or embodiment 21, wherein the locking means comprises at least two screws.

Embodiment 23: The alignment device of any preceding embodiment, wherein the adjustment means comprises one or more pair of opposed screws located on opposite sides of the perimeter of the mount.

Embodiment 24: The alignment device of embodiment 23, wherein the adjustment means comprises four screws arranged in two pairs, each pair formed of two opposing screws, the pairs arranged mutually orthogonally to one another.

Embodiment 25: The alignment device of any preceding embodiment, further comprising a sealing means located between the at least one curved bearing surface and the housing.

Embodiment 26: The alignment device of any one of embodiments 7 to 15, further comprising a sealing means located between the at least one curved bearing surface and the collar.

Embodiment 27: The alignment device of embodiment 25 or embodiment 26, wherein the sealing means is an elastomeric seal.

Embodiment 28: The alignment device of embodiment 25 or embodiment 26, wherein the sealing means is a metal seal.

Embodiment 29: The alignment device of embodiment 25 or embodiment 26, wherein the sealing means comprises multiple seals.

Embodiment 30: The alignment device of embodiment 29, wherein the sealing means comprises one of: more than one elastomeric seal; more than one metal seal; or at least one elastomeric seal and at least one metal seal.

Embodiment 31: The alignment device of any preceding embodiment wherein the apparatus is a transmitter.

Embodiment 32: Use alignment device of embodiment 31, wherein the transmitter emits at least one of electromagnetic waves, acoustic waves or matter.

Embodiment 33: The alignment, device of embodiment 31 or embodiment 32, wherein the transmitter is a laser light source.

Embodiment 34: The alignment device of any one of embodiments 1 to 30, wherein the apparatus is a receiver.

Embodiment 35: The alignment device of embodiment 34, wherein the receiver includes a detector configured to detect at least one of electromagnetic waves, acoustic waves or matter.

Embodiment 36: The alignment device of embodiment 35, wherein the detector is a photodiode.

Embodiment 37: The alignment device of any preceding embodiment, comprising an inlet and outlet means for a purge fluid, wherein at least one of the interior of the alignment device and an optical element in contact with the sample fluid is arranged to be purged with a purge fluid.

Embodiment 38: The alignment device of embodiment 37, where the purge fluid is a chosen fluid that will not spectroscopically absorb within a pass band of interest for an absorption measurement.

Embodiment 39: The alignment device of embodiment 37 or 38, further comprising at least one flow sensor for monitoring the flow rate of the purge fluid.

Embodiment 40: The alignment device of any one of embodiments 37 to 39, wherein the housing further comprises a flow alarm.

Embodiment 41: The alignment device of embodiment 40, wherein the flow alarm is a pressure monitoring system.

Embodiment 42: The alignment device of any previous embodiment, where the device incorporates at least one optical element.

Embodiment 43: The alignment device according to embodiment 42, where the optical element comprises one or more of: a window, lens, diffuser and reflective element.

Embodiment 44: The alignment device of embodiment 42 or embodiment 43, where the optical element has an anti-reflective coating.

Embodiment 45: The alignment device of any one of embodiments 42 to 44, where the optical element is a window which has a wedge shaped cross section.

Embodiment 46: The alignment device of any previous embodiment, where the interior of the device is sealed and wherein the device further includes a scrubber for scrubbing the internal volume of the device.

Embodiment 47: The alignment, device of any previous embodiment, further comprising at least one goniometric scale for indicating at least one of an azimuth angle and an elevation angle of the mount.

Embodiment 48: The alignment device of embodiment 47, where the goniometric scale comprises graduated marks on the adjustment screws with a spacing that corresponds to a given angular Increment at a given position.

Embodiment 49: A system, comprising: a transmitter; a receiver; and an alignment device according to any one of embodiments 1 to 48, wherein one of the transmitter and receiver is secured in the mount of the alignment device.

Embodiment 50: The system of embodiment 49, wherein the transmitter is a laser light source and the receiver includes a photodetector.

Embodiment 51: The system of embodiment 50, wherein the laser light source is arranged to transmit a laser beam through a fluid and onto the photodetector in order to detect at least one measurand substance in the fluid using absorption spectroscopy.

Embodiment 52: The system of embodiment 51, further comprising an inlet and outlet means for a purge fluid, wherein the interior of the alignment device and or optical element in contact with the sample is arranged to be purged with a purge fluid.

Embodiment 53: The system of embodiment 52, where the purge fluid is a chosen fluid that will not absorb light within a pass band of interest for an absorption measurement.

Embodiment 54: The system of any one of embodiments 49 to 53, further comprising an additional alignment device according to any one of embodiments 1 to 48, wherein the other of the transmitter and receiver is secured in the mount of the additional alignment device.

Embodiment 55: The system of any one of embodiments 49 to 54, wherein the alignment device is, or devices are, mounted to an exterior wall of a stack containing industrial process gas.

Embodiment 56: A method of aligning a first apparatus with respect to a second apparatus, comprising: a) securing a first alignment device according to any one of embodiments 1 to 48 to a first surface of an object; b) securing either the first apparatus or the second apparatus in the mount of the first alignment device; c) checking the alignment between the first apparatus and the second apparatus using an alignment verification means; d) adjusting the alignment of the first alignment device; e) repeating steps c) and d) until a satisfactory alignment of the first and second apparatuses has been achieved; and f) locking the first alignment device in position once a satisfactory alignment has been achieved.

Embodiment 57: The method of embodiment 56, wherein the first apparatus is an optical transmitter and the second apparatus is an optical receiver that includes a detector.

Embodiment 58: The method of embodiment 56 or embodiment 57, wherein the first apparatus is a tunable diode laser.

Embodiment 59: The method of any one of embodiments 56 to 58, wherein the alignment verification means comprises a laser light source that is removably fixed to the second apparatus, and wherein the method further comprises removing the alignment verification means once a satisfactory alignment has been achieved.

Embodiment 60: The method of embodiment 59, wherein the alignment verification means further comprises an optical scope that is removably fixed to the first apparatus.

Embodiment 61: The method of any one of embodiments 56 to 60, wherein the object is an industrial process stack containing a process gas and the first surface is an exterior wall of the process stack.

Embodiment 62: The method of any one of embodiments 56 to 61, wherein the method further comprises: securing a second alignment device according to any one of embodiments 1 to 48 to a second surface of the object; and securing the other of the first apparatus and second apparatus in the mount of the second alignment device; wherein adjustment step d) further comprises adjusting the alignment of at least one of the first and second alignment devices and wherein locking step f) further comprises locking the second alignment device in position once a satisfactory alignment has been achieved.

The invention claimed is:

1. An alignment device, comprising:
a mount for receiving a source or a detector, the mount having a first end, a second end and a central bore extending from the first end to the second end, the central bore having a longitudinal axis defining a line of sight for the source or the detector, wherein the mount comprises:
a body portion with at least one external curved bearing surface; and
an attachment collar projecting from the body portion and secured to the housing, the attachment collar comprising connection means for connecting the source or detector;
a housing for the mount, wherein the housing comprises a three-axis translation prevention device that prevents translation of the mount during rotation, wherein:
the first end of the mount is secured within the housing by the three-axis translation prevention device, such that the housing only permits rotation of the mount about a single point within the housing; and
the at least one external curved bearing surface bearing against the translation prevention device during rotation of the mount within the housing for preventing translation of the mount during rotation;
an adjustment device for adjusting the alignment of the mount within the housing, for alignment of the source or the detector with a desired transmission direction, wherein the adjustment means is seated in the attachment collar for contact with the body portion; and
a rotation restraining device for preventing rotation of the mount about an axis corresponding to the transmission direction, wherein the rotation restraining device comprises a protrusion in the body portion that engages with a slot in the attachment collar.

2. The alignment device of claim 1, wherein the at least one external curved bearing surface comprises paired bearing surfaces on opposite sides of the centre of rotation of the mount within the housing.

3. The alignment device of claim 2, wherein the body portion of the mount has two pairs of external curved bearing surfaces for bearing against the translation prevention device.

4. The alignment device of claim 1, wherein each of said at least one external curved bearing surface is a part of a spherical surface having its centre of curvature at the centre of rotation.

5. The alignment device of claim 1, wherein the translation prevention device comprises a set of bearing surfaces arranged to cooperate with the curved bearing surfaces of the mount.

6. The alignment device of claim 1, wherein at least one of the mount, housing, attachment collar and bearing is made of a ferrous alloy.

7. The alignment device of claim 6, wherein the ferrous alloy is stainless steel having a low coefficient of thermal expansion.

8. The alignment device of claim 1, wherein at least one of the mount, housing, bearing and collar includes a coating on a surface thereof.

9. The alignment device of claim 8, wherein the composition of the coating is selected such that a coefficient of thermal expansion of the coating is substantially identical to a coefficient of thermal expansion of the surface on which the coating is located.

10. The alignment device of claim 8, wherein the coating includes one or more of polytetrafluoroethylene (PTFE), tantalum and titanium nitride.

11. The alignment device of claim 1, further comprising a flexible protective sheath that is arranged to cover at least the mount and the collar, so as to prevent ingress of environmental contamination such as particulates or fluids.

12. The alignment device of claim 11, wherein the protective sheath also covers the adjustment device.

13. The alignment device of claim 1, wherein the mount has a through bore defining a transmission pathway through the mount for a received source or detector, and wherein the adjustment device is adapted to align the transmission pathway with a desired transmission direction.

14. The alignment device of claim 1, further including locking device for locking any set alignment position without altering that position, such that the set alignment position of the alignment device is fixed until released as required at a later time.

15. The alignment device of claim 14, where the locking device is furthermore adhered in position.

16. The alignment device of claim 14, wherein the locking device comprises at least two screws.

17. The alignment device of claim 1, wherein the adjustment device comprises two or more adjustment screws, each of which enables adjustment in one of two orthogonal angular degrees of freedom.

18. The alignment device of claim 1, wherein the adjustment device comprises one or more pairs of opposed screws located on opposite sides of the perimeter of the mount.

19. The alignment device of claim 18, wherein the adjustment device comprises four screws arranged in two pairs, each pair formed of two opposing screws, the pairs arranged mutually orthogonally to one another.

20. The alignment device of claim 1, further comprising a sealing device located between the at least one curved bearing surface and the housing.

21. The alignment device of claim 1, further comprising a sealing device located between the at least one curved bearing surface and the collar.

22. The alignment device of claim 21, wherein the sealing device comprises one of:
   at least one elastomeric seal;
   at least one metal seal; or
   at least one elastomeric seal and at least one metal seal.

23. The alignment device of claim 1, further comprising an inlet and outlet device for a purge fluid, wherein at least one of the interior of the alignment device and an optical element in contact with the sample fluid is arranged to be purged with a purge fluid.

24. The alignment device of claim 23, where the purge fluid is a chosen fluid that will not spectroscopically absorb within a pass band of interest for an absorption measurement.

25. The alignment device of claim 23, further comprising at least one flow sensor for monitoring the flow rate of the purge fluid.

26. The alignment device of claim 1, wherein the device incorporates at least one optical element.

27. The alignment device of claim 1, where the interior of the device is sealed and wherein the device further includes a scrubber for scrubbing the internal volume of the device.

28. The alignment device of claim 1, further comprising at least one goniometric scale for indicating at least one of an azimuth angle and an elevation angle of the mount.

29. A system, comprising:
   a source;
   a detector; and
   a first alignment device, comprising:
   a mount for receiving the source or the detector, the mount having a first end, a second end and a central bore extending from the first end to the second end, the central bore having a longitudinal axis defining a line of sight for the source or detector, wherein the mount comprises:
      a body portion with at least one external curved bearing surface; and
      an attachment collar projecting from the body portion and secured to the housing, the attachment collar comprising connection means for connecting the source or detector;
   a housing for the mount, wherein the housing comprises a three-axis translation prevention device that prevents translation of the mount during rotation, wherein:
      the first end of the mount is secured within the housing by the three-axis translation prevention device, such that the housing only permits rotation of the mount about a single point within the housing; and
      the at least one external curved bearing surface bearing against the translation prevention device during rotation of the mount within the housing for preventing translation of the mount during rotation;
   an adjustment device for adjusting the alignment of the mount within the housing, for alignment of the source or the detector with a desired transmission direction, wherein the adjustment means is seated in the attachment collar for contact with the body portion; and
   a rotation restraining device for preventing rotation of the mount for the first alignment device about an axis corresponding to the transmission direction, wherein the rotation restraining device comprises a protrusion in the body portion that engages with a slot in the attachment collar;
   wherein one of the source and the detector is secured in the mount of the alignment device.

30. The system of claim 29, wherein the transmitter is a laser light source and the receiver includes a photodetector.

31. The system of claim 30, wherein the laser light source is arranged to transmit a laser beam through a fluid and onto the photodetector in order to detect at least one measurand substance in the fluid using absorption spectroscopy.

32. The system of claim 29, further comprising an additional alignment device, the additional alignment device comprising:
   a mount for receiving a source or a detector, the mount having a first end, a second end and a central bore extending from the first end to the second end, the central bore having a longitudinal axis defining a line of sight for the source or the detector, wherein the mount comprises:
      a body portion with at least one external curved bearing surface; and
      an attachment collar projecting from the body portion and secured to the housing, the attachment collar comprising connection means for connecting the source or detector;
   a housing for the mount, wherein the housing comprises a three-axis translation prevention device that prevents translation of the mount during rotation, wherein:

the first end of the mount is secured within the housing by the three-axis translation prevention device, such that the housing only permits rotation of the mount about a single point within the housing; and the at least one external curved bearing surface bearing against the translation prevention device during rotation of the mount within the housing for preventing translation of the mount during rotation;

an adjustment device for adjusting the alignment of the mount within the housing, for alignment of the source or the detector with a desired transmission direction, wherein the adjustment means is seated in the attachment collar for contact with the body portion; and a rotation restraining device for preventing rotation of the mount for the second alignment device about an axis corresponding to the transmission direction, wherein the rotation restraining device comprises a protrusion in the body portion that engages with a slot in the attachment collar;

wherein the other of the source or the detector is secured in the mount of the additional alignment device.

33. The system of claim 29, wherein the first alignment device is configured to be mounted to an exterior wall of a stack containing industrial process gas.

34. A method of aligning a first apparatus with respect to a second apparatus, comprising:
a) providing a first alignment device, the first alignment device comprising:
a mount for receiving a source or detector, the mount having a first end, a second end and a central bore extending from the first end to the second end, the central bore having a longitudinal axis defining a line of sight for the source or detector, wherein the mount comprises:
a body portion with at least one external curved bearing surface; and
an attachment collar projecting from the body portion and secured to the housing, the attachment collar comprising connection means for connecting the source or detector;
a housing for the mount, wherein the housing comprises a three-axis translation prevention device that prevents translation of the mount during rotation, wherein:
the first end of the mount is secured within the housing by the three-axis translation prevention device, such that the housing only permits rotation of the mount about a single point within the housing; and
the at least one external curved bearing surface bearing against the translation prevention device during rotation of the mount within the housing for preventing translation of the mount during rotation;
an adjustment device for adjusting the alignment of the mount within the housing, for alignment of the source or the detector with a desired transmission direction, wherein the adjustment means is seated in the attachment collar for contact with the body portion; and
a rotation restraining device for preventing rotation of the mount for the first alignment device about an axis corresponding to the transmission direction, wherein the rotation restraining device comprises a protrusion in the body portion that engages with a slot in the attachment collar;
b) securing the first alignment device to a first surface of an object;
c) securing either the first apparatus or the second apparatus in the mount of the first alignment device;

d) checking the alignment between the first apparatus and the second apparatus using an alignment verification device;
e) adjusting the alignment of the first alignment device using the adjustment device of the first alignment device;
f) repeating steps d) and e) until a satisfactory alignment of the first and second apparatuses has been achieved; and
g) locking the first alignment device in position once a satisfactory alignment has been achieved.

35. The method of claim 34, wherein the first apparatus is an optical transmitter and the second apparatus is an optical receiver that includes a detector.

36. The method of claim 34, wherein the alignment verification device comprises a laser light source that is removably fixed to the second apparatus, and wherein the method further comprises removing the alignment verification device once a satisfactory alignment has been achieved.

37. The method of claim 34, wherein the object is an industrial process stack containing a process gas and the first surface is an exterior wall of the process stack.

38. The method of claim 34, wherein the method further comprises:
providing a second alignment device, the second alignment device comprising:
a mount for receiving a source or a detector, the mount having a first end, a second end and a central bore extending from the first end to the second end, the central bore having a longitudinal axis defining a line of sight for the source or detector, wherein the mount comprises:
a body portion with at least one external curved bearing surface; and
an attachment collar projecting from the body portion and secured to the housing, the attachment collar comprising connection means for connecting the source or detector;
a housing for the mount, wherein the housing comprises a three-axis translation prevention device that prevents translation of the mount during rotation, wherein:
the first end of the mount is secured within the housing by the three-axis translation prevention device, such that the housing only permits rotation of the mount about a single point within the housing; and
the at least one external curved bearing surface bearing against the translation prevention device during rotation of the mount within the housing for preventing translation of the mount during rotation;
an adjustment device for adjusting the alignment of the mount within the housing, for alignment of the source or the detector with a desired transmission direction, wherein the adjustment means is seated in the attachment collar for contact with the body portion; and
a rotation restraining device for preventing rotation of the mount for the second alignment device about an axis corresponding to the transmission direction, wherein the rotation restraining device comprises a protrusion in the body portion that engages with a slot in the attachment collar;
securing the second alignment device to a second surface of the object; and
securing the other of the first apparatus and second apparatus in the mount of the second alignment device;
wherein adjustment step e) further comprises adjusting the alignment of at least one of the first and second alignment devices and wherein locking step g) further comprises locking the second alignment device in position once a satisfactory alignment has been achieved.

\* \* \* \* \*